United States Patent Office 3,122,564
Patented Feb. 25, 1964

3,122,564
PROCESS OF PREPARING 3-METHYL-CHROMONE
Pierre Mastagli, Paris, France, assignor to Laboratoires Laroche Navarron, Levallois, Seine, France, a corporation of France
Filed June 12, 1962, Ser. No. 291,866
Claims priority, application France June 22, 1961
6 Claims. (Cl. 260—345.2)

Figure 1:
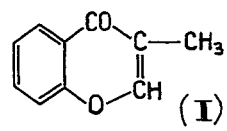

The present invention relates to the preparation of 3-methyl-chromone, compound (I) whose structure is shown in FIG. 1 of the accompanying drawings.

This compound has interesting therapeutic properties in particular for the treatment of angina pectoris.

A certain number of processes have been evolved for its preparation.

In a first type of process ortho-hydroxy-propiophenone is taken and is reacted with ethyl formate on the one hand, or with ethyl oxalate or ethoxalyl chloride on the other hand. The first reaction is however not easily carried out on an industrial scale whereas the second gives 3-methyl-chromone-2-carboxylic acid which must be decarboxylated.

In another process 3-phenoxy-2-methyl propanoic acid is cyclized by phosphoric acid in toluene solution. 3-methyl-chromanone is obtained which it is necessary to dehydrogenate on palladium to obtain the required compound.

Reference to these previous processes shows the interest of a process which is simpler to carry out on the industrial scale in starting with easily obtained and therefore cheap materials. The object of the present invention is to provide a process satisfying these conditions. This process comprises, in a first stage, condensing an alkali metal phenate with a dihalogenated methacrylic acid ester thereby obtaining a phenoxy-methacrylic acid ester and thereafter, after liberation of the phenoxy-methacrylic acid, cyclizing it in a second stage into 3-methyl chromone.

In this way 3-methyl chromone is rapidly obtained with good yields in two main stages in starting with cheap starting materials which are easily obtainable without obtaining the chromanone.

Figure 2:
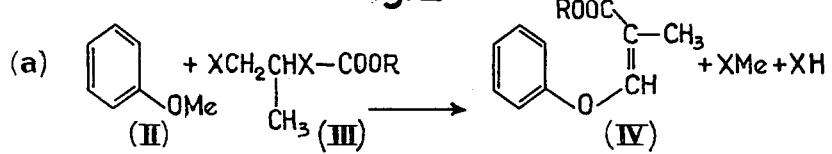
Figure 2:
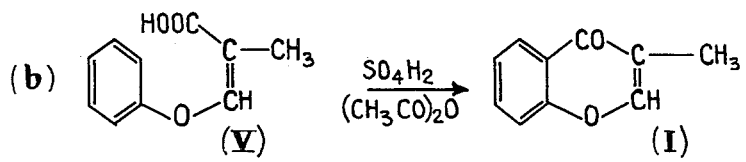

FIG. 2 of the accompanying drawing shows these two stages of the process at (a) and (b). In stage (a), the alkali metal phenate (II), Me representing an alkali metal and in particular sodium, is condensed with an alpha-beta-dihalogeno-methacrylic acid ester (III), X representing a halogen which is advantageously bromine, and R an organic residue such as an alkyl group and advantageously the methyl group.

The condensation is effected very simply by heating the reagents and obtaining phenoxy-methacrylic acid ester (IV) with liberation of the XMe alkali metal salt and the XH halohydric acid.

The reagents (II) and (III) are easily obtained from phenol and methacrylic ester respectively.

The ester (IV) is thereafter saponified and in the stage (b) the acid (V) just obtained is cyclized into 3-methyl chromone. Whereas in previous processes the cyclizing of the 3-phenoxy-2-methyl propanoic acid providing the chromanone was effected by posphoric acid in toluene solution, it has been found that the present cyclizing gave only poor yields under the same conditions.

On the other hand, and according to another feature of the invention, this cyclizing is carried out easily and with almost quantitative yields in a mixed medium: acetic anhydride and sulphuric acid.

The following example illustrates the invention.

Stage (a)

37 g. of NaOH were dissolved in 80 ml. of water. 100 g. of phenol were added and the mixture heated to 140° C. so as to remove the water. The water can also be eliminated azeotropically with a suitable solvent. 50 g. of metha methacrylate previously dibrominated by 80 g. of bromine (compound III, X=Br. R=CH$_3$) were added to said dry powder of sodium phenate. The mixture was heated for two hours. After washing and distilling the ester (IV) was obtained in a yield of 56%. It was a pale yellow liquid. B.P.$_{12}$=145° C., $n_D^{21}$=1.5395. This ester was saponified by an aqueous solution of sodium hydroxide. The acid (V) was liberated and dried.

Stage (b)

For cyclizing, 100 g. of the acid (V) thus obtained were dissolved in 200 ml. of acetic anhydride. Upon complete dissolution 100 ml. of concentrated sulphuric acid were added while stirring. The mixture was heated in a water bath so as to evaporate under a 20 mm. vacuum the acetic acid formed. It was allowed to cool and the whole was poured on a solution of concentrated ammonia while maintaining the medium alkaline. The chromone precipitated out with a theoretical yield of 80%.

Although a specific example of the invention has been given, it must be understood that the invention is not limited thereto but defined in the appended claims.

Having now described my invention what I claim as new and desire to secure by Letters Patent is:

1. Process of preparing 3-methyl chromone comprising condensing an alkali metal phenate with a dihalogenated methacrylic acid lower alkyl ester thereby obtaining a phenoxy-methacrylic acid lower alkyl ester, saponifying said ester into phenoxy methacrylic acid and cyclizing said acid into 3-methyl chromone.

2. Process as claimed in claim 1, wherein the alkali metal phenate is sodium phenate.

3. Process as claimed in claim 1, wherein the dihalogenated methacrylic acid is dibrominated methyl methacrylate.

4. Process of preparing 3-methyl chromone comprising heating a mixture of an alkali metal phenate and a dibrominated methacrylic acid lower alkyl ester thereby obtaining a phenoxy-methacrylic acid lower alkyl ester, saponifying said ester into phenoxy-methacrylic acid and treating said acid with a mixture of acetic anhydride and sulphuric acid so as to cyclize it into 3-methyl chromone.

5. Process of preparing 3-methyl chromone comprising heating a mixture of an alkali metal phenate and dibrominated methyl methacrylate thereby obtaining the methyl phenoxy methacrylate, saponifying the latter into phenoxy-methacrylic acid and treating said acid with a mixture of acetic anhydride and sulphuric acid so as to cyclize it into 3-methyl chromone.

6. Process of preparing 3-methyl chromone comprising heating a mixture of an alkali metal phenate and dibrominated methyl methacrylate thereby obtaining the methyl phenoxy-methacrylate, saponifying the latter into phenoxy-methacrylic acid, heating said acid with a mixture of acetic anhydride and sulphuric acid so as to cyclize it into 3-methyl chromone, distilling off the acetic acid formed during said cyclizing, alkalizing the residual mixture to precipitate 3-methyl chromone and recovering the latter.

References Cited in the file of this patent

Elderfield: Heterocyclic Compounds, vol. 2, pp. 16 and 249, 1951.